Feb. 13, 1962  L. J. REGIS ET AL  3,021,514

VOLTAGE COMPARATOR

Filed March 27, 1958

INVENTORS:
Lawrence J. Regis
William E. Richeson, Jr.

BY: GUST & IRISH
Attorneys

United States Patent Office 3,021,514
Patented Feb. 13, 1962

3,021,514
VOLTAGE COMPARATOR
Lawrence J. Regis and William E. Richeson, Jr., Fort Wayne, Ind., assignors to International Telephone and Telegraph Corporation
Filed Mar. 27, 1958, Ser. No. 724,398
10 Claims. (Cl. 340—248)

This invention relates generally to electrical measurement and more particularly to a voltage comparator circuit for determining whether or not a specific voltage is within a predetermined tolerance range.

There are numerous industrial control and test equipment applications in which it is desired accurately and rapidly to determine whether or not a particular voltage is within a specified tolerance range and it is generally necessary that such a determination be made with a high degree of accuracy. Furthermore, the voltages which are required to be compared frequently vary greatly in magnitude. It is therefore desirable to provide a voltage comparator which will, with a high degree of accuracy determine whether or not a specific voltage is within a specified tolerance range, and it is further desirable that such a comparator be sufficiently flexible to permit comparison of potentials varying over a wide range. While voltage comparator circuits have been available in the past, in those known to the applicant the magnitude of the voltage being tested was limited by the input characteristics of the device and individual selection of the circuit components, such as diodes and resistors, was necessary in order to obtain the desired accuracy. Furthermore, prior voltage comparators known to the applicant were not "fail safe" in that malfunctioning of the circuit did not necessarily result in an indication that the test voltage was outside of the specified tolerance. It is therefore further desirable to provide a voltage comparator circuit in which the above described deficiencies of prior circuits are eliminated.

Our invention in its broader aspects therefore provides a voltage comparator having a test voltage input circuit adapted to be connected to the voltage to be compared, and two reference voltage input circuits respectively adapted to be connected to reference voltages above and below the nominal test input voltage. Oscillator means are provided coupled to the input circuits and arranged to oscillate responsive to the test input voltage differing from one of the reference voltages by a predetermined amount in one direction, and to be blocked responsive to the test input voltage differing from the other of the reference voltages by a predetermined amount in the opposite direction. Two such comparators may be provided with their test voltage input circuits connected in parallel and with at least one of the reference voltages of one of the comparators being lower than either of the reference voltages of the other comparator. The oscillator means of the two comparators are arranged so that one oscillates when the test input voltage falls below one of the reference voltages by a predetermined amount and the other oscillates when the test input voltages rises above another of the reference voltages by a predetermined amount. Means may be couped to the output circuits of the comparators arranged to provide an output signal responsive to simultaneous oscillation of both of the comparators thereby indicating that the test input voltage is within the specified tolerance. In the preferred embodiment of our inventtion, the sensing of the potential of the voltage being tested is achieved by the use of a pair of similarly polarized serially connected diodes forming two legs of a bridge circuit which in turn is coupled to the oscillator means; one leg of the bridge circuit thus provides positive feedback for the oscillator means responsive to the test voltage differing from the reference potential by a predetermined amount in one direction and the other leg provides negative feedback for the oscillator means responsive to the test voltage differing from the other reference potential by a predetermined amount in the other direction. When two comparators are provided as above described, the diodes of one comparator are oppositely polarized from those of the other comparator.

It is therefore an object of our invention to provide an improved voltage comparator circuit.

Another object of our invention is to provide an improved voltage comparator circuit capable of determining whether a specific voltage is within a specified tolerance range with a high degree of accuracy.

A further object of our invention is to provide an improved voltage comparator circuit which eliminates the limitations in prior voltage comparator circuits.

The above-mentioned and other features and objects of this invention and the manner of attaining them will become more apparent and the invention itself will be best understood by reference to the following description of an embodiment of the inventtion taken in conjunction with the accompanying drawings, wherein.

Figure 4:
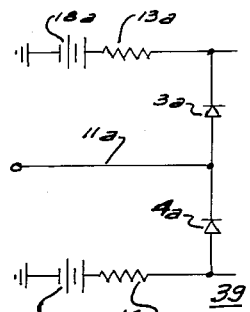
Figure 5:
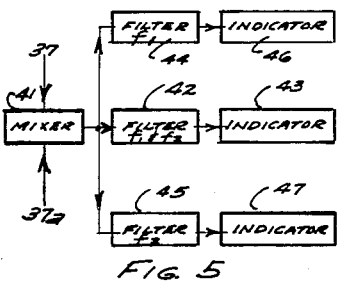

FIG. 4 is a fragmentary schematic circuit diagram showing the connection of the diodes of one of the comparators of the system of FIG. 3; and FIG. 5 is a fragmentary block diagram showing an addition to the system of FIG. 2 for providing an indication when the test input voltage is above or below the specified tolerance in addition to the indication showing that the test voltage is within the specified tolerance.

Figure 1:
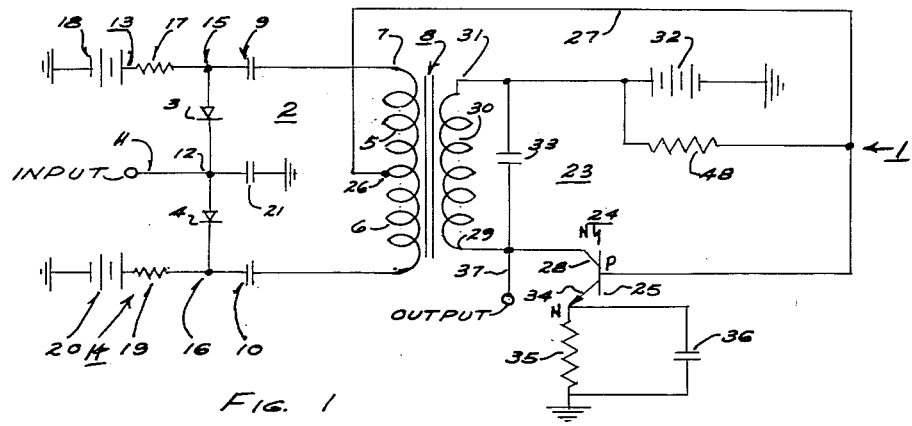
FIG. 1 is a schematic circuit diagram of a voltage comparator circuit in accordance with our invention.

Referring now to FIG. 1, a voltage comparator circuit which will determine whether or not a specific test voltage is above or below a specific reference potential is shown and is generally identified as 1. Here, a bridge circuit 2 is provided having two legs formed by a pair of similarly polarized serially connected diodes 3 and 4, such as silicon diodes with the other two legs being formed by the two halves 5 and 6 of secondary winding 7 of transformer 8 with capacitors 9 and 10 respectively connected in series therewith. An input circuit 11, adapted to be connected to the source of the test voltage (not shown) is connected to the midpoint 12 between the serially connected diodes 3 and 4 and reference voltage input circuits 13 and 14 are respectively connected to the opposite ends 15 and 16 of the diodes 3 and 4. Reference voltage input circuit 13 includes resistor 17 and is adapted to be connected to a suitable reference voltage, shown here as battery 18. Reference voltage input circuit 14 includes resistor 19 and is adapted to be connected to another source of reference voltage, shown here as being battery 20; the two reference voltages 18 and 19 are respectively above and below the nominal test input voltage by a predetermined amount. For example, assuming that the nominal test voltage is 4.125 volts D.C., reference voltage source 18 may have a potential of 5.25 volts D.C. and reference voltage source 20 may have a potential of 3.00 volts D.C. Midpoint 12 between diodes 3 and 4 is also connected to ground by means of capacitor 21 as shown.

An oscillator circuit 23 is provided having an NPN transistor 24 with its base element 25 connected to center tap 26 of primary winding 7 of transformer 8 by a connection 27 as shown. The collector 28 of the transistor 24 is connected to one end 29 of secondary winding 30 of transformer 8, the other end 31 of secondary winding 30 being connected to a suitable source of potential, shown here as battery 32. Capacitor 33 is connected across secondary winding 30 as shown. The emitter 34 of the transistor 24 is connected to ground by a suitable resistor 35 having capacitor 36 connected in parallel therewith and output circuit 37 is connected to the collector 28 of transistor 24 as shown.

In operation, assuming that the test voltage applied to input circuit 11 has a nominal value of 4.125 volts, the differential of 1.125 volts appearing respectively across diodes 3 and 4 is insufficient to cause either diode to conduct more than the other. Assuming now that the test potential falls to a value below 4.125 volts, for example to 3.50 volts, diode 3 will conduct more than diode 4 (the difference in current appearing in the signal lead) thereby causing a positive feedback to the oscillator circuit 23 which will cause it to oscillate thereby providing an output signal in the output circuit 37; thus, oscillation of the oscillator circuit 23 and the resultant output signal in the output circuit 37 indicates that the test input voltage is below the nominal value of 4.125. On the other hand, if the test input voltage rises above the nominal value of 4.125, i.e., for example to 4.50, diode 4 will conduct more than diode 3, thereby providing a negative feedback to the oscillator circuit 23 which blocks it against further oscillation thereby removing the output signal from the output circuit 37. Thus, it will now be seen that the occurrence of oscillation in the oscillator circuit 23 indicates that the test input voltage applied to the test input voltage circuit 11 is below the nominal value of 4.125 whereas the absence of oscillation indicates that the test input voltage is at or above the nominal value of 4.125. It will now also be seen that it is merely necessary that the potentials of the reference sources 18 and 20 differ by an amount sufficient so that the voltages respectively appearing across diodes 3 and 4 when the test input voltage is at its nominal value are insufficient to cause either diode to conduct more than the other. It will further be seen that the nominal test input voltage may be varied in either direction merely by simultaneously adjusting the potentials applied by the reference voltage sources 18 and 20 so that the same potential difference is applied.

Figure 2:
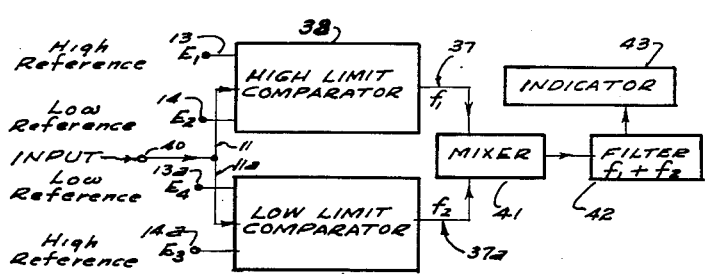
FIG. 2 is a schematic block diagram showing the connection of two voltage comparators in accordance with FIG. 1 in order to provide a determination of whether a specific test voltage is within a specified tolerance range.

Referring now to FIG. 2 in which the preferred embodiment of our invention is shown, we have provided two voltage comparators 38 and 39, the comparator 38 being identical to the comparator 1 of FIG. 1 with the comparator 39 having the polarity of the diodes $3a$ and $4a$ and the relative potentials of reference potential sources $18a$ and $20a$ reversed from those of FIG. 1, as shown in FIG. 4. Thus, and referring additionally to FIG. 4, assuming that the nominal test voltage applied to the input circuit $11a$ is 1.875 volts, the reference potential supplied by reference source $18a$ would be .75 volt and the reference potential supplied by the source $20a$ would be 3.00 volts. With this arrangement, if the nominal test potential applied to the input circuit $11a$ rises above 1.875 volts, diode $3a$ will conduct more than diode $4a$ thereby providing a positive feedback to cause the oscillator circuit 24 to oscillate and contrarywise, if the test voltage falls below 1.875 volts, diode $4a$ will conduct more than diode $3a$ thereby providing the negative feedback to terminate oscillation.

Referring again to FIG. 2, the input circuits 11 and $11a$ of the comparators 38 and 39 are connected in parallel to a common input terminal 40 and the output circuits 37 and $37a$ are connected respectively to the input circuits of a conventional signal mixer 41. The output circuit of the signal mixer 41 is connected to a conventional band-pass filter 42 tuned to pass either the sum or difference frequency of the output signal of the mixer 41, the filter 42 being in turn connected to a suitable indicator 43 for indicating the presence of an output signal from the filter 42.

Figure 3:
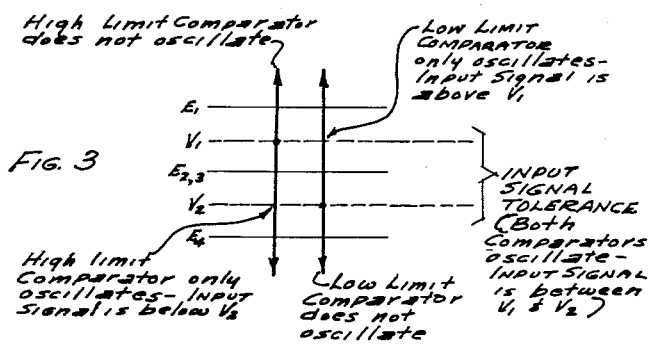
FIG. 3 is a diagram useful in explaining the mode of operation of the system of FIG. 2.

Referring now to FIG. 3 in addition to FIG. 2, it will be assumed that the high reference potential provided by the reference potential source 18 of comparator 38, and identified as $E_1$ in FIG. 3, is 5.25 volts and that the low reference potential supplied by the source 20, and identified as $E_2$ is 3.0 volts, thus making the nominal voltage at which point the diodes 3 and 4 will conduct equally, identified as $V_1$, 4.125 volts. It is likewise assumed that the low reference potential supplied by source $18a$ of comparator 39, identified as $E_4$, is .75 volt and that the high reference potential supplied by the source $20a$, identified as $E_3$, is 3.0 volts, thus making the nominal voltage at which point the diodes $3a$ and $4a$ will conduct equally 1.875 volts, identified as $V_2$ in FIG. 3. It will now be seen that the oscillator circuit 24 of comparator 38 will oscillate at any time when the test input voltage applied to the input terminal 40 falls below the nominal voltage $V_1$, whereas the oscillator circuit 24 of the other comparator 39 will oscillate at any time the test input voltage rises above the other nominal voltage $V_2$.

It will be recalled that with the specific reference potentials specified above, nominal voltage $V_1$ was 4.125 volts whereas nominal voltage $V_2$ was 1.875 volts, i.e., a spread of 2.25 volts, and it will thus be seen that for test input voltages between these two values, i.e., 4.125 volts and 1.875 volts, both of the oscillator circuits 24 of the comparators 38 and 39 will oscillate. It is thus seen that the tolerance range is provided between the nominal voltages $V_1$ and $V_2$. It will also be understood that the frequency at which the oscillators 24 of the comparators 38 and 39 will oscillate may be predetermined by a suitable selection of the transformers 8 and capacitors 33 and thus, the output signal from comparator 38 may be arranged to have a given frequency $f_1$ and the output signal from the other comparator 39 arranged to have a different frequency $f_2$. With filter 42 arranged to filter for example the sum of the two frequencies $(f_1+f_2)$ in the output signal of mixer 41, it will be seen that a final resultant output signal will be provided to the indicator 43 only when the oscillator circuits 23 of both of the comparators 38 and 39 are oscillating, thus in turn indicating that the test voltage applied to the input terminal 40 is within the tolerance, i.e., between $V_1$ and $V_2$. It will be readily understood, of course, that since the output signal from the mixer 41 includes frequencies $f_1$, $f_2$, $f_1+f_2$ and $f_1-f_2$, band-pass filter 42 may be equally advantageously tuned to pass the difference frequency $f_1-f_2$.

Referring now to FIG. 5, it will be readily seen that the system of FIG. 4 may be modified so as to provide a positive indication not only that the test voltage is within the tolerance $V_1$—$V_2$, but also when it is either above or below the tolerance. Thus, two additional band-pass filters 44 and 45 are provided connected to the output circuit of mixer 41 and two indicators 46 and 47 respectively; by tuning filter 44 to pass frequency output $f_1$ from comparator 38 and tuning filter 45 to pass frequency $f_2$ from the comparator 39, it will be seen that indicator 46 alone will provide an indication when the test input voltage is below voltage $V_2$, indicator 47 alone will provide an indication when the test input voltage is above voltage $V_1$, and all three indicators will provide indication when the test voltage is within the tolerance $V_1$—$V_2$.

It will now be readily seen that the tolerance range $V_1$—$V_2$ is readily and selectively adjusted merely by adjustment of the high and low reference potentials $E_1$ and $E_2$ of comparator 38 and $E_3$ and $E_4$ of comparator 39. Thus, if it is desired that the tolerance be 4.250 rather than the 2.250 provided with the specific reference voltages described above, it is merely necessary simultaneously to shift the reference potentials $E_1$ and $E_2$ to 7.25 and 5.00 respectively with the other reference potentials $E_3$ and $E_4$ remaining at their previous values. Thus, it will be seen that the low limit is now 1.875 volts as previously explained with the upper limit $V_1$ now being 6.125 volts. It will thus be readily seen that suitable and simultaneously shifting of either or both reference potentials $E_1$ and $E_2$ and $E_3$ and $E_4$ thereby selectively to shift the limits $V_1$ and $V_2$ which in turn determine the tolerance range may be readily accomplished in order to provide any desired tolerance with any desired median voltage.

In an actual circuit constructed in accordance with the foregoing, the components had the following values:

| | | |
|---|---|---|
| Resistors 17 and 19 | ohms | 100,000 |
| Diodes 3, 3a, 4, 4a | | PS 570 |
| Capacitors 9, 10, 21 | microfarads | .47 |
| Transformer 8 of comparator 38: | | |
|     Primary winding 5 | turns | 1,000 |
|     Secondary winding 30 | do | 1,000 |
| Transformer 8a of comparator 39: | | |
|     Primary winding 5a | turns | 1,000 |
|     Secondary winding 30a | do | 1,000 |
| Capacitor 33 | microfarads | .33 |
| Potential 32 | volts | 10 |
| Transistor 24 | | T1–905 |
| Resistor 48 | ohms | 91,000 |
| Resistor 35 | do | 6,200 |
| Capacitor 36 | microfarads | 5 |
| Frequency $f_1$ | kc | 100 |
| Frequency $f_2$ | do | 150 |

It will be readily apparent that the indicators 43, 46 and 47 may be any suitable device, such as, for example, an amplifier fed from the output of the respective filter and in turn energizing a relay with its contacts in the circuit of an indicator light.

It will be seen that the bi-stable comparator provide by our invention, utilizing both positive and negative feedback in the same oscillator sharpens the response and further that the use of a bridge-type sensing network eliminates the necessity of matching diodes and resistors and other eelments as was the case in prior comparator circuits. Furthermore, it will be readily understood that the bridge-type sensing circuit is relatively insensitive to temperature variations since both legs of the bridge are affected equally. It will further be seen that our improved circuit utilizes solid state devices as the active elements and that the circuit is "fail safe" in that both comparators must be operating properly in order to provide an indication that the sensed potential is within the specified tolerance band. Our improved voltage comparator circuit and system further provides more rapid and sharp response with a smaller number of components than has heretofore been provided by prior systems known to the applicants.

While we have described above the principles of our invention in connection with specific apparatus, it is to be clearly understood that this description is made only by way of example and not as a limitation to the scope of our invention.

What is claimed is:

1. A voltage comparator circuit comprising: a test voltage input circuit for connection to the voltage to be compared; two reference voltage input circuits respectively including reference voltage sources equally above and below the nominal test input voltage; regenerative feedback oscillator means including a feedback circuit; and a voltage-deviation sensing circuit having two branches respectively coupling said reference voltage input circuits to said test voltage input circuit for providing a positive feedback voltage in one of said branches responsive to deviation of the test voltage in one direction from the mid potential between the reference voltages and a negative feedback voltage in the other of said branches responsive to deviation of the test voltage in the other direction from the mid-potential between the reference voltages; said oscillator feedback circuit having two branches respectively coupled to said sensing circuit branches thereby providing two feedback paths for said feedback voltages respectively so that deviation of said test voltage in one direction from said mid potential provides said positive feedback voltage in one said feedback path to cause said oscillator means to oscillate and deviation of said test voltage in the opposite direction from said mid potential provides said negative feedback voltage in the other said feedback path to block said oscillator means against oscillation.

2. A voltage comparator circuit comprising: a test voltage input circuit for connection to the voltage to be compared; two reference voltage input circuits respectively including reference voltage sources above and below the nominal test input voltage; regenerative feedback oscillator means including a feedback circuit; a voltage-deviation sensing circuit having two branches respectively coupling said reference voltage input circuits to said test voltage input circuit for providing a positive feedback voltage in one of said branches responsive to deviation of the test voltage in one direction from the mid potential between the reference voltages and a negative feedback voltage in the other of said branches responsive to deviation of the test voltage in the other direction from the mid-potential between the reference voltages; said oscillator feedback circuit having two branches respectively coupled to said sensing circuit branches thereby providing two feedback paths for said feedback voltages respectively so that deviation of said test voltage in one direction from said mid potential provides said positive feedback voltage in one said feedback path to cause said oscillator means to oscillate and deviation of said test voltage in the opposite direction from said mid potential provides said negative feedback voltage in the other said feedback path to block said oscillator means against oscillation; and an output circuit coupled to said oscillator means and arranged to provide an output signal responsive to oscillation thereof.

3. In combination: first and second voltage comparators in accordance with claim 2 and having their test input circuits connected in parallel, the oscillator means of said comparators being free-running, said second voltage comparator having at least one of its reference voltages lower than either of the reference voltages of said first voltage comparator, said first voltage comparator being arranged to oscillate when said test input voltage falls below one of said reference voltages by a predetermined amount, said second voltage comparator being arranged to oscillate when said test input voltage rises above another of said reference voltages by a predetermined amount.

4. The combination of claim 3 further comprising means coupled to the output circuits of said first and second comparators arranged to provide an output signal responsive to simultaneous oscillation of both of said comparators.

5. The combination of claim 3 further comprising: signal mixing means having its input circuits coupled respectively to the output circuits of said first and second voltage comparators; and filter means coupled to the output circuit of said mixing means for providing an output signal responsive to simultaneous oscillation of the oscillator means of both of said voltage comparators.

6. The combination of claim 3 further comprising; signal mixing means having its input circuits coupled respectively to the output circuits of said first and second voltage comparators; first filter means coupled to the output circuit of said mixing means and arranged to provide a first output signal responsive to oscillation of said first voltage comparator only; second filter means coupled to said mixing means output circuit and arranged to provide a second output signal responsive to oscillation of said second voltage comparator only; and third filter means coupled to said mixing means output circuit and arranged to provide a third output signal responsive to simultaneous oscillation of said first and second voltage comparators.

7. A voltage comparator circuit comprising: a test voltage input circuit for connection to the voltage to be compared; two reference voltage input circuits respectively including reference voltage sources equally above and below the nominal test input voltage; a regenerative oscillator circuit; a voltage deviation-sensing circuit comprising a bridge circuit having four legs with two legs being formed by a pair of similarly polarized serially connected diodes with said test input circuit being coupled to the midpoint therebetween and said reference voltage input circuits respectively being coupled to the opposite ends thereof, said oscillator circuit being respectively coupled to the other two legs of said bridge circuit for respectively coupling oscillator energy thereto; said oscillator having a feedback circuit coupled to the midpoint between said other two legs of said bridge thereby providing two feedback paths for said oscillator circuit whereby deviation of a test input voltage from the mid potential between the reference voltages in one direction provides positive feedback through one said feedback path to said oscillator circuit to cause the same to oscillate and deviation of the test voltage in the opposite direction from said mid potential provides negative feedback through the other said feedback path to said oscillator circuit to block the same against oscillation; and an output circuit coupled to said oscillator circuit and arranged to provide an output signal responsive to oscillation thereof.

8. In combination: first and second voltage comparators in accordance with claim 7 the oscillator circuits of said comparators being free-running, the test voltage input circuits of said comparators being coupled in parallel, at least one of the reference voltages of said second comparator being lower than either of the reference voltages of said first comparator, the diodes of said second comparator being oppositely polarized from the diodes of said first comparator whereby said first comparator oscillates responsive to said test input voltage falling below its upper reference voltage by a predetermined amount and second comparator oscillates when said test input voltage rises above its lower reference voltage by a predetermined amount, said reference voltages being predetermined so that the voltage point at which said first comparator oscillates is above the voltage point at which said second comparator oscillates whereby both of said comparators oscillate between said voltage points; and means coupled to the output circuits of both of said first and second comparators for providing an output signal responsive to simultaneous oscillation of both of said first and second comparators.

9. A voltage comparator circuit comprising: a test voltage input circuit for connection to the voltage to be compared; two reference voltage input circuits respectively including reference voltage sources above and below the nominal test input voltage; an oscillator circuit including valve means having a control element and an output element, and transformer means having a secondary winding coupled in circuit with said output element of said valve means, said transformer having a center tapped primary winding; a pair of similarly polarized serially connected diodes having their opposite ends respectively coupled to the two ends of said primary winding, said primary winding center tap being coupled to said valve means control element, said test input circuit being coupled to the midpoint between said diodes and said reference voltage input circuits respectively being coupled to said opposite ends of said diodes whereby departure of the test input voltage from one of the reference voltages by a predetermined amount in one direction causes one of said diodes to conduct thereby to provide a positive feedback to said oscillator circuit to cause the same to oscillate, and departure of said test input voltage from the other reference voltage by a predetermined amount in the opposite direction causes the other of said diodes to conduct thereby to provide a negative feedback to said oscillator circuit to block the same against oscillation; and an output circuit coupled to said valve means for providing an output signal responsive to oscillation of said oscillator circuit.

10. A voltage comparator circuit comprising: a test voltage input circuit for connection to a direct current voltage to be compared; two reference voltage input circuits respectively including direct current reference voltage sources above and below the nominal test input voltage; a free-running oscillator circuit comprising, a transistor, a transformer having a center tapped primary winding and a secondary winding with said center tap being connected to the base of said transistor, the secondary winding of said transistor being serially connected with one of the collector and emitter elements of said transistor and a source of potential, said secondary winding having a capacitor connected thereacross, and a resistor with a capacitor connected thereacross being connected between the other of said collector and emitter elements and ground; a pair of similarly polarized serially connected diodes having their opposite ends respectively serially connected to the ends of said transformer primary winding by capacitors, said test input circuit being coupled to the midpoint between said diodes, a capacitor connected between ground and said midpoint, said reference voltage input circuits being coupled respectively to said opposite ends of said diodes whereby departure of the test input voltage from one of the reference voltages by a predetermined amount in one direction causes one of said diodes to conduct thereby to provide a positive feedback to said oscillator circuit to cause the same to oscillate, and departure of said test input voltage from the other reference voltage by a predetermined amount in the opposite direction causes the other of said diodes to conduct thereby to provide a negative feedback to said oscillator circuit to block the same against oscillation; and an output circuit coupled to said one transistor element for providing an output signal responsive to oscillation of said oscillator circuit.

References Cited in the file of this patent

UNITED STATES PATENTS

| 2,526,595 | Watts | Oct. 17, 1950 |
| 2,647,252 | Moore | July 28, 1953 |
| 2,721,977 | Rich | Oct. 25, 1955 |
| 2,803,703 | Sherwin | Aug. 20, 1957 |
| 2,858,438 | Merrill | Oct. 28, 1958 |

OTHER REFERENCES

Electronics, February 1956, pp. 150–151 (by A. Strassman).